United States Patent [19]

Baynum

[11] Patent Number: 4,484,660
[45] Date of Patent: Nov. 27, 1984

[54] STAND FOR A VERTICAL POST SUCH AS A TREE

[76] Inventor: Wallace E. Baynum, Box 242, R #1, Demossville, Ky. 41033

[21] Appl. No.: 504,296

[22] Filed: Jun. 14, 1983

[51] Int. Cl.³ .......................... A45F 3/26; A47C 9/10
[52] U.S. Cl. ..................................... 182/187; 108/152
[58] Field of Search ................. 182/187, 188; 108/152

[56] References Cited

U.S. PATENT DOCUMENTS

| 1,515,831 | 11/1924 | Bush | 182/188 |
| 1,542,548 | 6/1925 | Gordon | 182/187 |
| 1,826,120 | 10/1931 | Booth | 182/187 |
| 2,375,685 | 5/1945 | Pennington | 182/187 |
| 3,885,649 | 5/1975 | Damron | 182/187 |
| 4,244,445 | 1/1981 | Strode | 182/187 |

FOREIGN PATENT DOCUMENTS 1072523 12/1959 Fed. Rep. of Germany ...... 182/187

Primary Examiner—Reinaldo P. Machado
Attorney, Agent, or Firm—Wood, Herron & Evans

[57] ABSTRACT

A stand, for supporting a person on a vertical post such as a hunter in a tree, including a platform having a generally horizontal top surface upon which the hunter stands and a support assembly below the platform including a pair of struts providing load-bearing support between the platform and the tree. A cable which extends around the tree opposite the platform has a first end attached to the platform and a second end attached to a cable tensioning arrangement which is mounted on the platform. The cable tensioning arrangement includes a lever pivotally attached to the platform and a drawbar which is pivotally attached at a first end to the lever, at a point spaced outwardly from the platform, and which has a second end upon which is affixed a spool to which the second end of the cable is attached. The cable is tightened about the spool with the lever in a first position, extending generally outwardly from the platform, and the lever is then pivoted away from the tree and toward the platform to move the drawbar and spool away from the tree to substantially increase the cable tension about the tree. The thus-tensioned cable prevents slippage of the tree-engaging edge of the platform in a vertical direction along the tree. The tree-contacting elements of the tree stand are padded to prevent damage to the tree, and the lever may be locked in its cable-tensioning position to prevent removal of the tree stand from the tree.

6 Claims, 4 Drawing Figures

STAND FOR A VERTICAL POST SUCH AS A TREE

BACKGROUND OF THE INVENTION

There are presently a wide variety of tree stands available to hunters. One common type of tree stand is a "strand-on stand". Strap-on stands are usually fastened to a tree using a chain or a nylon cord or strap. In order to reach the desired height with the stand, the hunter may use a variety of climbing procedures and apparatus, such as commercially available tree steps. When at the desired height, the hunter chains or straps the stand to the tree for use.

Typically, such a tree stand includes a platform upon which the hunter stands. The platform has a tree-engaging edge, with the platform extending outwardly therefrom. The platform is supported by an appropriate support framework, such as struts beneath the platform which bear against the trunk of the tree. The support framework supports the outer portion of the platform, and the inner portion of the platform is prevented from sliding downwardly along the trunk of the tree due to the fastening of the chain or strap securely about the trunk of the tree.

There are a number of disadvantages to prior tree stands of the general type outlined above. A primary disadvantage with certain of such tree stands is that they damage the trees to which they are mounted. For example, the support framework in some prior tree stands of this type has included a tree-piercing stake or projection for anchoring the support framework to the tree.

Another problem with such prior tree stands is an inability to properly tighten the chain or cable about the tree to prevent vertical slippage of the tree-engaging edge of the platform. If the chain is not properly tightened, the platform may slip relative to the tree, resulting in collapse of the tree stand. In some cases, in an effort to overcome the difficulties in satisfactorily tightening the chain or cable, the above-mentioned pointed projections or spikes, injurious to a tree, have been employed.

SUMMARY OF THE INVENTION

This invention relates generally to platforms and supports and more particularly concerns a stand for supporting a load such as a human being on a generally vertical element such as a tree or a pole.

It is the general aim of the invention to provide a stand which may be firmly attached to a tree or a pole, without damaging the tree or pole.

In carrying out the invention, a tree stand is provided which includes a platform supported by a support assembly coupled between the tree and the platform, and a tensioning cable extending around the tree and attached at one end to the platform and is coupled at the other end to a tensioning lever pivotally attached to the platform. In one embodiment of the invention, the support assembly takes the form of a pair of struts, each of which is attached at a first end to the platform, with the second ends of the struts being joined at a channel member which includes a padded surface bearing against the tree. In this embodiment of the invention, there is also included a drawbar which is pivotally attached at one end to the tensioning lever and has, fixedly mounted at its other end, a spool to which the second end of the tensioning cable is attached. To secure the platform to the tree, the lever is rotated away from the tree, pulling the drawbar and the spool away from the tree, thereby tensioning the cable.

The invention is disclosed particularly in relation to tree stands in which the present stand is employed as a support structure for a hunter in a tree. While the invention will be described in connection with tree stands for hunters, it will be understood that it is also applicable to supporting other types of loads and for use on other structures or posts such as poles or the like.

Other objects and advantages of the invention, and the manner of their implementation, will become apparent upon reading the following detailed description and upon reference to the drawings, in which.

Figures 1, 2, 3, 4:
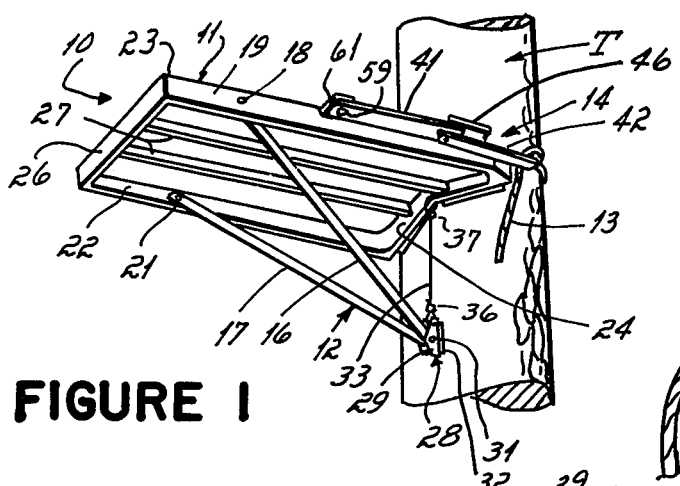
FIG. 1 is a perspective view of a tree stand constructed in accordance with the present invention, mounted on a tree.
FIG. 2 is an enlarged top view of the tree stand of FIG. 1.
FIG. 3 is an enlarged side view of the tree stand of FIG. 1.
FIG. 4 is an enlarged perspective view of the cable tensioning arrangement of the tree stand.

Referring now to the figures, the tree stand 10 includes a platform 11 maintained in position on a tree T by a support framework, indicated generally as 12, and a tensioning cable 13. A hunter, or other user of the tree stand, upon reaching the desired height in the tree, positions the platform 11 and support framework 12 as shown in FIGS. 1 and 3 and attaches the tensioning cable 13 around the tree using a tensioning arrangement, indicated generally as 14, as shall be described hereinafter.

In order to support the outer portion of the platform 11, the support framework includes a pair of struts 16, 17 extending between the platform 11 and the tree T at a point below the platform. A first end of the strut 16 is pivotally attached by a pin 18 to a downwardly extending side flange 19 of the platform 11. A first end of the strut 17 is pivotally attached by a pin 21 to a downwardly extending flange 22 on the opposite side of the platform 11. In the preferred form, the struts are constructed of galvanized steel tubing.

The platform 11 is a single aluminum casting having a generally horizontal platform portion 23 of approximately rectangular shape. The platform 11 includes a number of downwardly extending flanges including the side flanges 19 and 22, a flange 24 on the tree-engaging edge of the platform, and a flange 26 on the outermost edge of the platform. The underside of the platform 11 includes a pair of strengthening ribs 27, and the top surface of the platform portion 23 is preferably textured to improve footing.

In order to provide support for the outer portion of the platform 11, the two struts 16, 17, which are pivotally attached to the platform at their first ends, are welded together at their second ends. The welded ends of the struts are attached to a channel member 28, which in turn bears against the tree T. The joined struts 16, 17 are pivotally attached to a pair of legs 29 of the channel 28 by a pin 31. A resilient pad 32 of a material such as urethane is bonded to the base of the channel 28, the pad 32 thereby being interposed between the channel and the tree to prevent damage to the tree.

The struts 16, 17 are free to pivot on the pins 18, 21 from a position immediately beneath the platform 11 to an extended position such as shown in FIGS. 1 and 3. The downward pivoting of the struts 16, 17 is limited by a support framework cable 33 which is coupled between the platform 11 and the channel 28. The cable 33 is multi-filament cable of high strength, such as aircraft cable. At its lower end, the cable 33 is looped about a pin 34 mounted between the legs 29 of the channel 28, with the free end of the cable being rigidly attached to the portion of the cable above the pin 34 by a compression fitting 36.

The top of the cable 33 is similarly received through an aperture in the flange 24 along the tree-engaging edge of the platform 11. The upper end of the cable 33 is therefore formed into a loop, passing through the aperture in the flange 24, with the free upper end of the cable 33 being rigidly attached to the portion of the cable immediately below the flange with a compression fitting 37.

In order to prevent slippage of the tree-engaging edge of the platform 11, relative to the tree T, the tensioning cable 13 is attached at a first end to one side of the platform 11 and at the other end of the tensioning arrangement 14. The first end of the cable 13 is passed through an apertured flange 38, formed integrally with the platform 11, looped back upon itself, and secured within a compression fitting 39 to prevent removal of the cable through the flange 38.

The tensioning arrangement 14 to which the second end of the cable 13 is attached includes a lever 41, to which is pivotally attached a drawbar 42 carrying a fixed spool 43 which receives the cable 13. With the tensioning arrangement 14 generally in the position shown in FIG. 4, the cable 13 is hand-tightened about the tree T, with the second end of the cable secured about the spool 43. The lever 41 is then rotated in the direction of the arrow 44, into the position shown in FIG. 2, thereby pulling the drawbar 42 and spool 43 somewhat further from the tree, securely tightening the cable about the tree.

To mount the lever 41 on the platform, a first end of the lever is apertured, with the aperture being aligned beneath a corresponding aperture in a flange 46, integrally formed with the platform 15. The lever 41 is pivotally attached to the flange 46 by a bolt 47. The lever 41 is in turn pivotally attached to one end of the drawbar 42 by a bolt 48. The spool 43 is fixedly mounted, such as by welding, at the other end of the drawbar 42. The spool 43 includes an upper wall 51 and a lower wall 52, defining a circumferential groove which receives several turns of the end portion of the cable 13. The lower wall 52 includes a slot 53 therein in order to assist in securing the cable 13 within the groove while wrapping the cable around the spool.

In order to secure the cable 13 to the spool 43, the tensioning arrangement 14 is positioned generally as shown in FIG. 4, and the cable 13 hand-tightened about the tree T. The free end of the cable 13 is then brought over the drawbar 42 and pulled into the groove in the spool 43. The end of the cable 13 is then drawn down through the slot 53 and held there. With the free end of the cable 13 held in position, a few additional loops of cable are placed around the spool 43, over the cable already positioned in the groove in the spool. To do this, the cable is grasped generally in the area of the arrow 54 (FIG. 4) and wrapped around the spool 43 in the direction of the arrow.

After the cable is thereby hand-tightened to the extent possible, the lever 41 is rotated in the direction of the arrow 44, which pulls the drawbar 42 and the spool 43, with the cable now affixed thereto, somewhat further away from the tree T, substantially increasing the tension of the cable 13. In one tree stand constructed in accordance with the present invention, cable tension producing a force against a tree in excess of 350 pounds was obtained using the disclosed tensioning arrangement. This tree stand supported a load on the platform in excess of 1,000 pounds, without damage to the tree, other than a slight flattening of the tree bark.

In order to protect the tree when the cable 13 is tensioned around it for holding the platform in place, the cable 13 is received in a flexible tube 56, such as a urethane tube, along the portion of the cable which will contact the tree. In addition, a pair of resilient pads 57, 58, of a material such as urethane, are bonded to the tree-engaging edge of the platform 11, on the outside of the flange 24.

Once the tree stand 10 is mounted in a tree, it may be desirable to leave the stand in such a position unattended. In order to prevent unauthorized removal of the tree stand, the level arm 41 may be locked to the platform 11 with the cable 13 in its highly tensioned condition. In order to do this, the outer end of the lever 41 includes an aperture 59. When the lever 41 is in its cable-tensioning position, as shown in FIG. 2, the lever 41 is beneath a flange 61 formed integrally with the platform 11. With the lever in this position, an aperture 62 in the flange 61 is aligned with the aperture 59 in the lever. The aligned apertures 59, 62 may receive a suitable pin or lock in order to prevent movement of the lever arm and thereby prevent releasing the tension in the cable 13 and removal of the tree stand.

In one form of the tree stand 10, the platform 11 has a top surface approximately two feet long by one and one-half feet wide. The lengths of the struts 16, 17 in this form of the tree stand were selected to obtain an approximately horizontal upper surface for the platform 11 when the stand is mounted on trees having trunks ranging in diameter from about 10 inches to about 24 inches, with the platform orientation being best for a tree of about 15 inches in diameter.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention, as defined by the appended claims.

What is claimed is:

1. A tree stand comprising:
    a platform having a generally horizontal top surface and a tree-engaging edge;
    a pair of support struts each having a first end pivotally attached to the platform at locations spaced apart from said tree-engaging platform edge, the second ends of the struts being joined together;
    a channel receiving said second ends of the struts and attached thereto, the channel for positioning adjacent the tree;
    a first cable attached at a first end to the platform and at a second end to the channel to limit the movement of the channel away from the platform;
    a second cable for extending around the tree opposite the platform having a first end coupled to the platform and having a second end;
    a lever pivotally attached at a first location to the platform;

a drawbar having a first end pivotally attached at a second location on the lever, spaced apart from said first location, and having a second end; and a spool fixedly mounted on the second end of the drawbar, the second end of the second cable for extension around the tree being wrapped about and retained upon the spool, the lever and drawbar having a first position for drawing the cable about the tree with a first amount of tension, and the lever being pivotable to move the lever and the drawbar to a second position for drawing the cable about the tree with a second increased amount of tension.

2. The tree stand of claim 1 which further comprises at least one resilient pad attached along the tree-engaging edge of the platform, a resilient pad attached to the channel for interposition between the channel and the tree, and a flexible tube surrounding at least a portion of the second cable for extension around the tree.

3. The tree stand of claim 2 in which the top surface of the platform is textured and in which the tree-engaging edge of the platform is contoured to receive the tree.

4. The tree stand of claim 1 in which the spool mounted on the drawbar includes a pair of walls defining a groove about its periphery, a portion of the second end of the second cable being received in said groove of the spool.

5. The tree stand of claim 4 in which one of the walls defining the groove in the spool is notched to receive a portion of said second end of the second cable.

6. The tree stand of claim 1 in which the lever is apertured and in which the platform further includes an apertured flange, the aperture in the flange being aligned with the aperture in the lever when the lever is in said second position, whereby a lock or a pin may be inserted through the aligned apertures.

* * * * *